Patented Apr. 27, 1954

2,676,950

UNITED STATES PATENT OFFICE 2,676,950

LOW UNSATURATION CURABLE TRIPOLYMER RESINS FROM A DIOLEFIN, AN ALKENE AND STYRENE OR HOMOLOGUE THEREOF

William J. Sparks and David W. Young, Westfield, N. J., assignors to Standard Oil Development Company, a corporation of Delaware No Drawing. Application November 29, 1951,
Serial No. 258,986

2 Claims. (Cl. 260—80.7)

This invention relates to novel high molecular weight polymeric products and to methods of making and using them for various particular purposes, for which they are especially suited, and more particularly the invention relates to the preparation of modified copolymers of an alkene such as isobutylene with a polymerizable olefinic cyclic compound such as styrene.

U. S. Patent 2,274,749 describes copolymers of the general type referred to above such as copolymers of isobutylene and styrene, without the modification which is the chief feature of this invention. The above mentioned patent also describes the methods of carrying out the copolymerization, namely by the use of a temperature below about 0° C., such as —10° C., —20° C., —50° C., —90 C., —103 C. (the boiling point of liquid ethylene) or even lower, and by the use of an active halide polymerization catalyst.

Such catalyst may be aluminum chloride, boron fluoride, or activated boron fluoride containing 0.1% of ether, titanium tetrachloride, aluminum alkoxide-aluminum chloride complex $(AlCl_3.Al[OC_2H_5]_3)$ $AlBr_3$, $AlBr_3.Al(OC_2H_5)_3$, $(AlBr_3)_4.AlOBr$ and the like. If desired, such catalyst may be dissolved in a solvent such as carbon disulfide, a low molecular weight sulfur-free saturated hydrocarbon, a lower alkyl halide, e. g. methyl chloride or ethyl chloride or a mixture of methyl chloride with butane or propane, at or below the boiling point of the catalyst solvent, and then the catalyst solution cooled down, filtered and added to the reaction mixture. Alternative catalysts include: $AlCl_3.AlCl_2OH$, $AlBr_3.AlBr_2OH$, $AlBr_2Cl.AlOCl$ $AlBrCl_2.AlOBr$, $TiCl_4.AlCl_2OH$, $TiOCl_2.TiCl_4$, $AlBr_3.Br_2.CS_2$, $AlBr_3.Br_4.CS_2$, $BF_3$-isopropyl alcohol complex, $BF_3$ solution in ethylene, activated $BF_3$ catalyst in ethylene solution.

The copolymerization is preferably carried out in the presence of a volatile solvent or diluent or refrigerant, such as propane, ethane, ethylene, methyl chloride, carbon dioxide (liquid or solid), etc.; such materials may be used either as internal refrigerants or external refrigerants or both, to remove the liberated heat of polymerization.

After completion of the copolymerization, residual catalyst may be hydrolyzed by adding an alcohol, for example, isopropyl alcohol or ethyl alcohol, or water or both, and removed by washing the product with water and preferably also with dilute aqueous caustic soda. Any residual solvents or wash water or other hydrolyzing agents may be removed by heating the copolymer with or without milling, kneading or other agitation.

The modification of the above described process, as carried out by the present invention, comprises the use of three instead of two monomeric polymerizable reactants, the third or new reactant being a small amount of a diolefin such as isoprene.

Instead of isobutylene as the alkene, other lower aliphatic olefins may be used, preferably isoolefins having 4 to 8 carbon atoms such as isopentane (methyl-2 butene-1), or a normal pentene obtained by dehydration of secondary amyl alcohol, although other lower olefins such as propylene may also be used.

Instead of styrene as the polymerizable olefinic cyclic compound, other materials may be used such as alpha-methyl styrene, para-methyl styrene, alpha-para-dimethyl styrene, indenes, terpenes, etc. Various derivatives or homologues of such compounds having one or more short alkyl groups (e. g. 1 to 10 carbon atoms) attached to the cyclic nucleus and not interfering with the polymerization, may be used.

Instead of isoprene as the modifying diolefin, one may also use butadiene; 2,3-dimethyl butadiene 1-3; 1,4-dimethyl butadiene 1,3; piperylene; 2-methyl 3-ethyl butadiene; and 2-methylpentadiene; or one may use triolefins such as alloocimene; myrcene; and hexatriene.

The proportions to be used in making up the polymerization feed stock may vary over a fairly wide range, depending partly on the ratio for instance of isobutylene to styrene, and upon the proportion of diolefins desired. Normally, however, the amount of isobutylene or other alkene should be within the general range of about 27 to 61% by wt., while the styrene or other polymerizable olefinic cyclic compound should be about 38 to 68% by wt., and finally the amount of diolefin should be about 1 to 5% by wt.

The preferred procedure for carrying out the invention is to mix the isobutylene, styrene, and isoprene, or their equivalents, cool them down to the desired operating temperature, by either external or internal refrigeration, preferably having some diluent or solvent present, and then adding to that polymerization feed the desired amount of catalyst or solution thereof, preferably agitating the mixture well during the addition of the catalyst.

After hydrolysis and removal of catalyst as previously mentioned, the high molecular weight polymer which is the desired tripolymer, may be heated if desired, with or without milling or other agitation, to remove residual traces of solvent, diluent or refrigerant, or of water or alcohol left from the washing step. The tripolymer per se is a plastic generally having an average molecular weight by the Staudinger method, ranging from about 2,000 to 100,000 or more, about 5,000 to 60,000 being most frequently obtained. When the copolymerization is carried out on an olefin feed which contains from 50 to 80% by weight of styrene at only moderately low temperatures such as −23.7° C., the boiling point of methyl chloride, the tripolymer is of a resinous nature having a melting point in the general range of about 125 to 175° F., and ordinarily it is quite soluble in aromatic solvents such as benzene, toluene, and the like. In some cases, particularly with higher proportions of diolefins such as 5 to 20% or so of isoprene, the polymer may not, after it has been removed from polymerization reactants, be completely soluble in benzene or toluene, but this solubility may be considerably increased by hot milling at about the melting point of the tripolymer; it is believed that this hot milling may effect some breakdown of the gel structure of three-dimensional polymer structure or some other tripolymer molecule. On the other hand, when the copolymerization is carried out at much lower temperatures such as −103° C., the boiling point of ethylene, the tripolymer has a higher molecular weight and a tougher and more flexible texture and consistency, and can readily be sheeted out into thin, self-supporting films by rolling on the regular rubber mill or by calendering, with or without some modifying or plasticizing agent such as paraffin wax, zinc stearate, etc.

One important characteristic of this new tripolymer is that it has a slight unsaturation, having an iodine number from about 0.2 to 20, preferably 0.5 to 10, so that when it has been used as a coating composition, the slight unsaturation permits the coating surface to harden further by oxidation. This slight unsaturation also gives this resinous plastic the ability to be vulcanized or cured by treatments somewhat similar to those used for vulcanizing a synthetic rubber made by low temperature copolymerization of isobutylene in the presence of a small amount of a polyolefin of 4 to 12 carbon atoms, such as 1 to 3% of isoprene or somewhat larger amount such as 5 to 10% or so of butadiene.

For curing the tripolymer, one may use sulfur and one of the various fast accelerators or ultra-accelerators such as tetramethyl thiuram disulfide, mercapto benzothiazole, dinitrosobenzene, quinone dioxime with an oxidizing agent such as lead peroxide or lead oxide or benzoyl peroxide, or esters and salts of quinone dioxime, as curing agents. The quantities may vary from 0.3 to 6 parts by weight of resin, the 6 parts being used in the case of the esters and 0.3 for quinone dioxime or para dinitrosobenzene. Temperatures of curing may be from room temperature to 400° F. Time of cure may vary from 10 seconds (at high temperature) to possibly several days or a week at room temperature.

The new tripolymer of this invention has many different uses; one of the most important is in the coating compositions, in which case it may be applied either in solution in a volatile solvent such as toluene, or in a fatty oil, e. g. a drying oil such as linseed oil, or may be applied in a molten condition. The film has good adhesivity, and not only gives good protection immediately but also has slight drying properties and becomes slightly harder with oxidation and aging. Another important use of this new tripolymer is as an adhesive for bonding two or more layers of sheet materials together, such as, for instance, bonding two pieces of glass, especially optical glass, making laminated wood, laminated paper products, laminated cloth, laminated products containing metal foil joined to paper or cloth, etc. or laminated products including transparent plastic such as regenerated cellulose, cellulose acetate, etc.

The further valuable use of this new tripolymer is as a compounding agent for adding to waxes such as paraffin wax, petrolatum, etc. or natural waxes, asphalt, coal tar, petroleum cracking coal tar, mineral oils, or blending with other resins, etc.

The invention will be better understood from a consideration of the following examples:

EXAMPLE 1

These new polymers or resins are reactive with sulfur, sulfur chlorides and the like to produce "vulcanizates" of increased hardness, decreased solubility in organic solvents, and increased abrasion resistance, in somewhat the same manner as is the synthetic rubber which is made by low temperature Friedel-Crafts polymerization of isobutylene containing about 1 to 10% of polyolefin using as catalyst aluminum chloride dissolved in methyl chloride or ethyl chloride. However, the styrene in the present tripolymers increases the modulus compared to that of such synthetic rubber. The new polymers are also reactive and cure with the non-sulfur cure or paraquinone dioxime cure, as well as the para or meta dinitroso benzene, or para or meta dinitroso cymene, or quinone dioxime dibenzoate type of non-sulfur cures. For instance, an active olefin polymerization feed was prepared containing 40% of styrene, 3% of isoprene and 57% by volume of isobutylene, and this mixture, with two volumes of methyl chloride, was copolymerized at −103° C., using a catalyst consisting of 0.9 g. $AlCl_3$ per 100 ml. of methyl chloride. Using specific gravity figures of 0.91 for styrene, 0.68 for isoprene, and 0.625 for isobutylene, the same as used later in Example 3, the above reaction mixture shows by calculation, 49.1% by weight of styrene, 2.8% by weight of isoprene, and 48.1% by weight of isobutylene. The catalyst was killed and the product recovered by placing the liquid in a large Pyrex beaker and heating slightly to remove methyl chloride. The resulting tripolymer is a hard, dry resin, fairly flexible and colorless; it may be referred to as resin "A." It is highly soluble in benzene and toluene, at room temperature. It is also soluble in 1% concentration in a mineral oil that had a viscosity at 210° F. of 38 seconds Saybolt Universal and a viscosity index of 9. However, in a 1% concentration the tripolymer increased the viscosity of the oil at 210° F. to 44 seconds Saybolt Universal and increased the viscosity index to 87.

EXAMPLE 2

Resin "A" described above under Example 1 was subjected to a para-quinone dioxime cure to make cement as follows:

Separate mixtures (#1) and (#2) as listed in Table 1, were made on a rubber mill at room temperature, then (#1) and (#2) were each dissolved separately in benzene to formulate mixtures of 20% concentration by weight.

Table #1

|  | #1 | #2 |
|---|---|---|
|  | Parts/wt. | Parts/wt. |
| Tripolymer | 100 | 100 |
| ZnO | 5 | 5 |
| Stearic acid | 3 | 3 |
| p-quinone dioxime | 4 |  |
| PbO₂ |  | 1.2 |

Just before using the synthetic cement the separate mixtures (#1) and (#2) were well mixed at room temperature. The cement solution was then placed on a clean porcelain disk and used to bond a piezoelectric crystal. The bond, after two days, was found to be good and the bond helped to construct an instrument which was used for radar work.

This same procedure is suitable for making coatings of cured tripolymer on cloth for use as raincoats, shower curtains, etc., and for cementing together two pieces of porcelain, glass, etc. as in joining parts of porcelain dolls, etc.

Also, the resulting vulcanized or cured tripolymer was found valuable as an adhesive for bonding optical glass because of the good adhesion to glass and high modulus of the cured tripolymer.

EXAMPLE 3

A copolymerization feed was formulated as follows:

| Material | Volume (ml.) | Sp. Gr. | Calculated Wt. (g.) | Percent (by Weight) |
|---|---|---|---|---|
| Styrene | 80 | 0.91 | 72.8 | 64 |
| Isobutylene | 60 | 0.625 | 37.5 | 33 |
| Isoprene | 5 | 0.68 | 3.4 | 3 |
|  |  |  | 113.7 |  |

To the above cold liquid feed was added 400 ml. of cold methyl chloride. When the temperature of the mixture was −23.7° C. about 100 ml. of "methyl chloride-AlCl₃" catalyst was added. The concentration of AlCl₃ in Me Cl was 0.9 g. AlCl₃ per 100 ml. As the catalyst was added polymer was formulated. After about 10 minutes the liquid mixture was treated with 50 ml. of isopropyl alcohol to kill the catalyst. After this the mixture was placed in a Pyrex beaker and heated. The dry resin resulted from this drying step. The polymer, referred to herein as resin "B," was soluble in toluene at room temperature, and had an average molecular weight of about 8,000 to 10,000.

EXAMPLE 4

A 20% solution of resin "B" in toluene was made and then brushed on steel. Tests proved that the product had good adhesion and did not let the steel rust after 6 months exposure in New Jersey. After the exposure test the resin was cut from the steel and analysis of the product is listed:

|  | Per cent |
|---|---|
| C | 83.28 |
| H | 9.52 |
| Total | 92.80 |

These data prove that the resin absorbed oxygen.

EXAMPLE 5

The new tripolymer of this invention is also a very good plasticizer for natural and synthetic rubbers, particularly the synthetic rubber referred to in the following tests.

A synthetic isobutylene-diolefin copolymer rubber having an average molecular weight of about 100,000 (Staudinger) was made by copolymerizing 98.5% by weight of isobutylene and 1.5% by weight of isoprene at −103° C., using liquefied ethylene as internal refrigerant, two volumes of methyl chloride as solvent per one volume of polymerization feed, and using as catalyst a solution of 0.28% by weight of AlCl₃ in methyl chloride, about 4 volumes of this catalyst solution being used per volume of polymerization feed. After hydrolysis and removal of the residual catalyst, this synthetic rubber was tested on the Brabender Plastograph (see A. S. T. M. Proceedings vol. 38, Part II, 1938, pages 551 to 572). In this test, carried out at 138° C., the chart for the synthetic rubber showed only a slight and gradual reduction in plasticity from about 950 or 1,000 in a substantially straight line down to about 700 or 750, during a 25 minute test period, thus indicating a substantial need for the addition of a plasticizer.

A tripolymer resin was now prepared according to this invention by copolymerizing a feed containing 58% by weight of styrene, 37% by weight of isobutlyene and 5% by weight of isoprene, effecting the polymerization at the boiling point of methyl chloride, using as catalyst a solution of AlCl₃ in methyl chloride, using a catalyst concentration and volume corresponding to that used in Example 3.

After hydrolysis and removal of the catalyst, the tripolymer recovered, which is referred to as resin "C," was compounded in 2.5% concentration with some of the same 100,000 molecular weight synthetic rubber described above, and the blend was subjected to a similar test on the Brabender Plastograph, at 140° C., (which is substantially the same temperature as used for testing the synthetic rubber). The chart for this blend showed a very quick drop in plasticity from about 1,000 down to about 600 in 2 minutes, down to 500 in 3 minutes, about 400 in 7 minutes and then only a very slight and gradual dropping to about 370 or 380 after a total time of 17 minutes, thus showing that the 2.5% of resin "C" very effectively plasticized the 100,000 molecular weight synthetic rubber. In fact, this plasticized blend gave a Plastograph curve not very different from that obtained with an unplasticized synthetic isobutylene-diolefin copolymer rubber of only one-half the molecular weight, namely about 50,000 molecular weight.

EXAMPLE 6

In order to make a more detailed study of the effective compounding of this new tripolymer with the 100,000 molecular weight synthetic rubber, a series of tests was made using various amounts of synthetic rubber and tripolymer and using various percentages of styrene in the tripolymer feed, the resulting product being subjected to a 50 pt. Cabot #9 cure at 307° F. for 20, 40 and 60 minutes, respectively, and then tested for Mooney, tensile strength, elongation and modulus. The following amounts of hydrocarbon mixture (including the synthetic rubber and the tripolymer), fillers, and curing materials were used:

100.0 parts hydrocarbon mixture
3.0 parts zinc oxide
3.0 parts stearic acid
2.0 parts sulfur 50.0 parts Cabot #9 carbon black
1.0 part Tuads (tetramethyl thiuram disulfide)
0.5 part Captax (mercapto benzothiazole)

The addition agents listed above were added to the hydrocarbon material, or mixture, on a rubber mill for compounding in the usual manner. The results of this series of tests are shown in the following table.

*Strength tests on blends: Synthetic rubber and tripolymers*

| Test No. | Composition of Blend (Parts by Wt.) | | Percent/ weight Styrene in Tripolymer Feed | Mooney (at 212° F.) | | 50 Pt. Cabot #9 Cure at 307° F.— Tensile-Elongation | | | Modulus at 300% | | |
|---|---|---|---|---|---|---|---|---|---|---|---|
| | Synthetic Rubber | Tripolymer [1] | | 1½′ | 5′ | 20′ | 40′ | 60′ | 20′ | 40′ | 60′ |
| 1 | 100 | | | 48 | 44 | 2,800-875 | 2,850-800 | 2,800-750 | 350 | 475 | 575 |
| 2 | 100 | 10 | 20 | 47 | 45 | 2,550-850 | 2,650-750 | 2,600-725 | 425 | 525 | 675 |
| 3 | 100 | 10 | 30 | 48 | 45 | 2,500-800 | 2,600-750 | 2,600-700 | 500 | 650 | 800 |
| 4 | 100 | 10 | 40 | 46 | 45 | 2,500-850 | 2,550-750 | 2,550-700 | 475 | 725 | 800 |
| 5 | 100 | 10 | 50 | 49 | 45 | 2,450-800 | 2,450-700 | 2,450-675 | 575 | 675 | 800 |
| 6 | 100 | 25 | 20 | 43 | 41 | 2,500-800 | 2,500-725 | 2,550-650 | 550 | 650 | 850 |
| 7 | 100 | 25 | 30 | 41 | 38 | 2,300-750 | 2,300-700 | 2,300-650 | 600 | 775 | 875 |
| 8 | 100 | 25 | 40 | 38 | 34 | 1,950-675 | 2,000-600 | 1,900-550 | 675 | 875 | 950 |
| 9 | 100 | 25 | 50 | 35 | 35 | 1,750-650 | 1,850-600 | 1,900-575 | 825 | 975 | 1,050 |

[1] The tripolymer in all cases was made from a polymerization feed containing 3%/wt. of isoprene, the percent of styrene shown and the balance isobutylene. The copolymerization being carried out in the presence of 3 volumes of CH₃Cl solvent per one volume of polymerization feed, at a temperature of −103° C. maintained by the use of liquefied ethylene as external refrigerant, and by the use of a catalyst comprising AlCl₃ in methyl chloride.

The above table shows that although the blending of tripolymers with such synthetic rubber effects some reduction in tensile strength and a slight reduction in elongation, it effects a much more substantial increase in the modulus (at 300% elongation).

EXAMPLE 7

Another tripolymer was formulated from a polymerization feed containing 63.5% by weight of styrene, 3.7% by weight of isoprene, and 32.6% by weight of isobutylene. Three volumes of methyl chloride were used as a solvent and diluent for each volume of active olefin type feed. To this mixture, cooled externally to −100° C. by the use of liquid ethylene, was added 0.4 volume of 0.6% "AlCl₃-methyl chloride" catalyst. The mixture was agitated as the catalyst was slowly added. When all of the active feed had been polymerized a light red color developed in the polymerized feed. The total time of polymerization was 8 minutes. After this reaction, 0.05 volumes of isopropyl alcohol was added to kill the catalyst. The polymer with excess methyl chloride was removed from the reactor. The tripolymer was then heated in a Pyrex beaker to remove excess methyl chloride and alcohol. To remove the last trace of solvent the tripolymer was milled at 220° F. This tripolymer is readily soluble in aromatic solvents. A viscosity test in toluene solution at 100° F. indicated that the polymer had an intrinsic viscosity of 0.90. The polymer had unsaturation, as the iodine number was found to be approximately 2.0.

EXAMPLE 8

This unsaturated type of polymer was dissolved in toluene in 6% by weight concentration. The aromatic solution of polymer was then coated on paper, cloth, wood, trap rock, glass, silver, steel and regenerated cellulose sheets. Tests indicated that the polymer reacted with the oxygen in the air to produce a water-insoluble hard film. The film was resistant to moisture, alkalis, alcohol, some dilute acids, some concentrated acids, formaldehyde and aliphatic hydrocarbon solvents.

EXAMPLE 9

Another tripolymer was made at low temperature by copolymerizing a feed containing 70% by weight of styrene, 2.5% by weight of isoprene and 27.5% by weight of isobutylene, the polymerization being carried out at −103° C. in methyl chloride solution by the use of an aluminum chloride catalyst similar to that used in Example 7. After hydrolysis and removal of the catalyst the product was found soluble in benzene and toluene also compatible with polybutene, rubber, Butyl rubber, paraffin wax and petrolatum, etc. This tripolymer is an exceedingly tough but flexible and substantially non-tacky plastic which can be sheeted out by rolling or calendering into thin, substantially transparent, colorless, self-sustaining films.

EXAMPLE 10

Another tripolymer was made at low temperature by copolymerizing a feed containing 38% by weight of styrene, 1.4% by weight of 2,3-dimethyl butadiene 1-3, and 60.6% by weight of isobutylene, the polymerization being carried out at −89° C. in methyl chloride solution (three volumes CH₃Cl per volume of active olefin feed) by the use of BF₃ catalyst in methyl chloride. The concentration of BF₃ in the methyl chloride was about 4% by weight and the volume of catalyst solution used was 200 ml. per liter of active feed. Polymerization was conducted in a well agitated reactor and after 5 minutes the yield of tripolymer was 84% by weight. The product was placed in a Pyrex beaker, washed with water to kill catalyst and then heated for 6 hours at 110° C. to remove solvent.

The dry polymer was dissolved in toluene at room temperature to formulate a 5% solution. This tripolymer-toluene solution (25 ml.) was then added to 500 ml. of an asphalt cut back. The composition of the cut back is given as follows:

50% by weight—200° F. softening point oxidized asphalt
50% by weight—Petroleum aromatic solvent naphtha (boiling point 80° C. to 140° C.

The tripolymer-asphalt cut back mixture was then brushed on steel. Tests proved that the coating had good adhesion and good surface properties.

EXAMPLE 11

Another tripolymer was made at low temperature by copolymerizing a feed containing 69.4% by weight of styrene, 1.25% by weight of myrcene and 29.35% by weight of isobutylene, the polymerization being carried out at −78° C. in methyl chloride solution (three volumes of methyl chloride per volume of active olefin feed) by the use of $AlCl_3$ catalyst in methyl chloride. About 500 grams of powdered Dry Ice ($CO_2$) per liter of feed was used as the internal refrigerant. The mixture was well agitated as the clear catalyst solution was added. Concentration of $AlCl_3$ in methyl chloride was 0.68 g. per 100 ml. Volume of catalyst used was 308 ml. per liter of active feed. After the catalyst had been all added the polymer was removed from the excess solvent and Dry Ice, washed with water, and then dried. Yield of product was 86%.

The dry polymer had an intrinsic viscosity when tested at 20° C. in toluene of 0.56.

This tripolymer (100 g.) was added on a mill to 100 g. of 120,000 molecular weight (Staudinger) polybutene. The tripolymer-polybutene blend had less surface tack than the original polybutene. The tensile of the blend was found to be 584 lbs./sq. in. at 25° C. The tensile of the original polybutene was 60 lbs./sq. in.

EXAMPLES 12 AND 13

A hydrocarbon tripolymer was made, using 40% by weight of styrene, 3% by weight isoprene and 57% by weight isobutylene, at −103° C. in methyl chloride as solvent, and was dried and compounded on a mill with the compounding ingredients shown:

| Example | 12 | 13 |
|---|---|---|
| | Parts | Parts |
| Tripolymer | 200 | 200 |
| Zinc oxide | 10 | 10 |
| Stearic acid | 6 | 6 |
| Tuads [1] | 2 | |
| Sulfur | 3 | 3 |
| Paraquinone dioxime dibenzoate | | 12 |
| $Pb_3O_4$ | | 16 |
| Total batch wt | 221 | 247 |

[1] Tetramethyl thiuram disulfide.

The mixtures 12 and 13 were then placed in a mold and cure was given to 4″ x 6″ slabs at 307° F. for 10 min., 20 min., 40 min. and 60 min. Results are as follows:

| Example | Cure Time, min. | Tensile, Lbs./sq. in. | Elong., percent |
|---|---|---|---|
| 12 | 10 | 1,023 | 547 |
| 12 | 20 | 1,335 | 470 |
| 12 | 40 | 1,413 | 370 |
| 12 | 60 | 1,553 | 367 |
| 13 | 10 | 1,010 | 407 |
| 13 | 20 | 1,030 | 380 |
| 13 | 40 | 1,055 | 353 |
| 13 | 60 | 1,100 | 313 |

EXAMPLE 14

A series of tests were made using copolymers of isobutylene and 3% by weight of isoprene together with various amounts of styrene ranging from 0 to 70% by weight, the copolymerization temperature being −103° C. Each stock or copolymer (tests 1 to 9 inclusive), was compounded on a rubber mill, using the following compounding ingredients and proportions:

| | Parts |
|---|---|
| Polymer | 100 |
| Zinc oxide | 5 |
| Stearic acid | 3 |
| Tuads (tetramethyl thiuram disulfide) | 1 |
| Captax (Mercapto benzothiazole) | 0.5 |
| Cabot #9—carbon black | 50.0 |
| Sulfur | 2.0 |

The compounded stocks were then placed in a rubber mold and 4″ x 6″ slabs were made. Each slab was cured at 307° F. using curing times of 20, 40, 60 and 90 mins.

The composition of the tripolymers and their physical properties, i. e. tensile strength and per cent elongation, after curing, are indicated in the following table:

| Test No. | Percent by wt. | | | Time Cure, min. | Tensile, Lb./sq. in. | Percent Elong. at Break |
|---|---|---|---|---|---|---|
| | Styrene | Isoprene | Isobutylene | | | |
| 1 | 0 | 3 | 97 | 20 | 2,700 | 863 |
| 1 | 0 | 3 | 97 | 40 | 2,883 | 747 |
| 1 | 0 | 3 | 97 | 60 | 2,903 | 717 |
| 1 | 0 | 3 | 97 | 90 | 2,910 | 660 |
| 2 | 5 | 3 | 92 | 20 | 1,867 | 830 |
| 2 | 5 | 3 | 92 | 40 | 2,043 | 717 |
| 2 | 5 | 3 | 92 | 60 | 2,070 | 643 |
| 2 | 5 | 3 | 92 | 90 | 2,120 | 590 |
| 3 | 10 | 3 | 87 | 20 | 2,233 | 840 |
| 3 | 10 | 3 | 87 | 40 | 2,377 | 690 |
| 3 | 10 | 3 | 87 | 60 | 2,443 | 623 |
| 3 | 10 | 3 | 87 | 90 | 2,428 | 570 |
| 4 | 20 | 3 | 77 | 20 | 1,415 | 643 |
| 4 | 20 | 3 | 77 | 40 | 1,560 | 520 |
| 4 | 20 | 3 | 77 | 60 | 1,588 | 450 |
| 4 | 20 | 3 | 77 | 90 | 1,601 | 413 |
| 5 | 30 | 3 | 67 | 20 | 1,238 | 453 |
| 5 | 30 | 3 | 67 | 40 | 1,390 | 393 |
| 5 | 30 | 3 | 67 | 60 | 1,481 | 323 |
| 5 | 30 | 3 | 67 | 90 | 1,518 | 273 |
| 6 | 40 | 3 | 57 | 20 | 1,750 | 106 |
| 6 | 40 | 3 | 57 | 40 | 1,763 | 113 |
| 6 | 40 | 3 | 57 | 60 | 1,873 | 100 |
| 6 | 40 | 3 | 57 | 90 | 1,813 | 80 |
| 7 | 50 | 3 | 47 | 20 | 2,236 | 30 |
| 7 | 50 | 3 | 47 | 40 | 2,053 | 73 |
| 7 | 50 | 3 | 47 | 60 | 2,173 | 86 |
| 7 | 50 | 3 | 47 | 90 | 2,210 | 66 |
| 8 | 60 | 3 | 37 | 20 | 3,190 | 10 |
| 8 | 60 | 3 | 37 | 40 | 3,520 | 10 |
| 8 | 60 | 3 | 37 | 60 | 3,450 | 13 |
| 8 | 60 | 3 | 37 | 90 | 3,463 | 43 |
| 9 | 70 | 3 | 27 | 20 | ([1]) | ([1]) |

[1] Too brittle to pull.

It is noted in the above table that as the per cent styrene is raised from 0 to 30%, the tensile strength of the cured product decreases, but with a styrene content increasing from 40% to 70%, the tensile strength again increases, finally reaching a figure well above 3,000 lbs./sq. in. for a 60% styrene content, this being considerably higher tensile strength than the product containing no styrene at all.

Also it is noted from the above table that the cured products containing 40% or more of styrene have an elongation at break of considerably less than 200%, in fact ranging from only slightly above 100% down to about 10 or 20%.

Thus the cured tripolymers of this invention have a tensile strength of about 1700 to 3500 lbs./sq. in., and an elongation at break ranging from about 110 to 10%. Accordingly these cured tripolymers are strong resinous materials and are not at all elastic rubbery products.

This new tripolymer may be compounded with fillers such as clay, chalk, powdered silica, carbon black, zinc oxide, etc. or various coloring agents such as iron oxide, titanium dioxide, or blue, green or other colored pigments, or oil-soluble dyes of various colors. Antioxidants may also be added such as di-ortho-tertiary butyl derivative of para cresol. Plasticizing or softening agents may also be added, such as zinc stearate, small amounts of paraffin wax, petroleum sulfonates, etc., in order to improve the workability during milling, kneading, sheeting, or calendering, etc.

This application is a continuation-in-part of applications Ser. No. 550,488 filed August 21, 1944, and Ser. No. 632,102 filed November 30, 1945, both now abandoned.

It is not intended that this invention be limited to the specific materials which have been recited merely for the sake of illustration, but only by the appended claims in which it is intended to claim all novelty inherent in the invention as well as all modifications coming within the scope and spirit of the invention.

What is claimed is:

1. The process which comprises copolymerizing a mixture of reactants consisting essentially of about 64% by weight of styrene, about 3% by weight of isoprene, and about 33% by weight of isobutylene, at a temperature at least as low as −10° C. with a Friedel-Crafts catalyst.

2. A resinous tripolymer derived from a reaction mixture consisting essentially of about 64% by weight of a material selected from the group consisting of styrene and its homologs having 1 to 2 methyl substituents, about 3% by weight of a polyolefin of 4 to 10 carbon atoms, and about 33% by weight of an alkene having 3 to 8 carbon atoms, said tripolymer having an average molecular weight of at least 2,000 and an iodine number of about 1 to 20, and having been made by copolymerization at a temperature at least as low as −10° C. with a Friedel-Crafts catalyst.

References Cited in the file of this patent

UNITED STATES PATENTS

| Number | Name | Date |
|---|---|---|
| 2,391,095 | Kellog | Dec. 18, 1945 |
| 2,398,976 | Thomas | Apr. 23, 1946 |
| 2,438,340 | Johnson | Mar. 23, 1948 |
| 2,497,458 | Kurtz | Feb. 14, 1950 |

FOREIGN PATENTS

| Number | Country | Date |
|---|---|---|
| 106,371 | Australia | Jan. 26, 1939 |
| 599,437 | Great Britain | Mar. 12, 1948 |
| 599,484 | Great Britain | Mar. 12, 1948 |
| 918,101 | France | Oct. 7, 1946 |